United States Patent
Fujiwara et al.

(10) Patent No.: US 7,972,233 B2
(45) Date of Patent: Jul. 5, 2011

(54) BEARING ROLLER CHAIN

(75) Inventors: Makoto Fujiwara, Osaka (JP); Makoto Tanimura, Osaka (JP); Tetsuo Imamoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 950 days.

(21) Appl. No.: 11/862,649

(22) Filed: Sep. 27, 2007

(65) Prior Publication Data
US 2008/0131040 A1 Jun. 5, 2008

(30) Foreign Application Priority Data
Dec. 5, 2006 (JP) ................................. 2006-328637

(51) Int. Cl.
*F16G 13/02* (2006.01)
(52) U.S. Cl. ........................................ 474/209; 474/231
(58) Field of Classification Search .................. 474/181, 474/182, 199, 206, 209, 230, 231; 384/477, 384/484, 488, 489; 277/567, 551, 549; 305/136, 305/138, 102–105
See application file for complete search history.

(56) References Cited

U.S. PATENT DOCUMENTS

| | | | | |
|---|---|---|---|---|
| 2,411,207 A | * | 11/1946 | Hait | 403/152 |
| 2,411,214 A | * | 11/1946 | Keech | 403/150 |
| 4,094,515 A | * | 6/1978 | Araya et al. | 277/402 |
| 4,424,050 A | * | 1/1984 | Sato | 474/231 |
| 4,464,151 A | * | 8/1984 | Kahl | 474/231 |
| 4,729,754 A | * | 3/1988 | Thuerman | 474/207 |
| 4,795,408 A | * | 1/1989 | Kotegawa et al. | 474/209 |
| 5,222,920 A | * | 6/1993 | Cheesman et al. | 474/213 |
| 5,269,729 A | * | 12/1993 | Thuerman et al. | 474/207 |
| 5,425,679 A | * | 6/1995 | Utz | 474/91 |
| 5,459,993 A | * | 10/1995 | Kuriyama et al. | 59/4 |
| 5,468,376 A | * | 11/1995 | Bates | 210/160 |
| 5,787,700 A | * | 8/1998 | Tanaka | 59/5 |
| 5,809,767 A | * | 9/1998 | Tanaka | 59/5 |
| 5,879,257 A | * | 3/1999 | Tanaka | 474/207 |
| 5,943,855 A | * | 8/1999 | Morimoto et al. | 59/5 |
| 6,742,935 B2 | * | 6/2004 | Saji | 384/587 |
| 6,782,688 B2 | * | 8/2004 | Garbagnati et al. | 59/5 |
| 7,467,509 B2 | * | 12/2008 | Yamane et al. | 59/4 |
| 2008/0124015 A1 | * | 5/2008 | Fujiwara et al. | 384/484 |

FOREIGN PATENT DOCUMENTS
JP 62-004122 1/1987

* cited by examiner

*Primary Examiner* — William E Dondero
(74) *Attorney, Agent, or Firm* — Dann, Dorfman, Herrell and Skillman, P.C.; Henry H. Skillman

(57) ABSTRACT

A bearing roller chain which is sealed by a seal mechanism which prevents entry of foreign substances from the outside and leakage of lubricating oil leakage from the inside to the outside, resulting in an improvement in wear resistance of the bearing roller and avoidance both of rotation failure of the roller and of increased traveling resistance of the chain. A seal mechanism is provided between an inner link plate of a bearing roller chain and a bearing roller assembly carried by the link plate. The bearing roller assembly is formed by a plurality of anti-friction rollers between a hollow roller and a bush. The seal mechanism comprises an inner annular oil seal member, a spacer and a disk-shaped seal member having a flange extended toward an outer side surface of the hollow roller loosely into an outer circumferential concave groove on an end surface of the hollow roller. The disk-shaped seal member slidably comes into close contact with the inner link plate and the spacer, respectively. The flange and concave groove form a labyrinth structure protecting the inner annular seal member from entry of foreign substances from the outside. The annular seal has a plurality of lips supplementing the labyrinth seal structure.

8 Claims, 4 Drawing Sheets

BEARING ROLLER CHAIN

FIELD OF INVENTION

The present invention relates to a bearing roller chain used in a transmission chain, which transmits power, a conveyor chain or the like, and more specifically relates to a hollow bearing roller chain, in which a multi-seal structured seal mechanism is provided between a bearing roller and an inner link plate the invasion of foreign substances such as dust, water and the like to the inside of the bearing roller can be prevented so that wear resistance life of the bearing roller is improved.

BACKGROUND OF THE INVENTION

Since a bearing roller chain is adapted to high speed and high load in a case of the transmission of power, it has been widely used as a high speed transmission chain and a conveyor chain. And in the use of the bearing roller chain in an atmosphere of dust, an atmosphere of water splashing or the like, a seal mechanism is provided between an inner link plate and a bearing roller in a chain to prevent invasion or entry of foreign substances between the bearing roller and a bush which rotatably supports the bearing roller and to prevent the scattering of grease or oil sealed between a bearing roller and the bush. Various seal mechanisms have been proposed.

FIG. 5 is an enlarged cross-sectional view of a conventional bearing roller chain. The bearing roller chain 21 provides inward flanges 22a on both sides of a hollow roller 22. A number of anti-friction rollers 24 are disposed between the hollow roller 22 and a bush 23. A thrust ring 27 composed of a low frictional, wear-resistant synthetic resin and an oleo-sintered metal as a seal mechanism is provided between the hollow roller 22 and an inner link plate 25. Further, a lubricating-oil-filled space 28 is provided inside the thrust ring 27. It is noted that the reference numeral 26 denotes an outer link plate and the reference numeral 29 denotes a connecting pin.

In the above-mentioned conventional bearing roller chain, a seal mechanism 22 is a one-layered structure composed of a thrust ring 27 provided between a roller 22 and an inner link plate 25. The seal performance is not sufficient and when the thrust ring 27 has a low close contact with the roller 22 or the inner link plate 25, lubricating oil can leak out of any space or gap between an end surface of the hollow roller 22 and the thrust ring 27. Further, there is a problem that foreign substances such as dust, water or the like may enter through the gap to mix into the lubricating oil so that wear of the roller 22, the bush 23, the roller 24 and the like is promoted, resulting in failure of the roller's rotation generated by the wear, and the life of the chain is shortened. In this case, there is a problem that when close adherence properties are increased so as to avoid generating a gap between the thrust ring 27 and the roller 22 or the inner link plate 25, traveling resistance of the chain is increased and power required to drive the conveyor is increased.

SUMMARY OF THE INVENTION

Accordingly, a primary object of the present invention is to solve the above-mentioned prior art problems and to provide an improved bearing roller chain, in which the seal performance of a seal mechanism is sufficient, achieving prevention of invasion or entry of foreign substances from the outside, prevention of lubricating oil leakage to the outside and the like. An improvement of wear resistant life of the bearing roller and the suppression of rotation failure of the roller can also be achieved and an increase in the traveling resistance of the chain can be avoided.

The present invention solves the problems by providing a bearing roller chain in which both end portions of a bearing-mounted bush are fit-secured into bush holes of a pair of inner link plates and an improved seal mechanism is provided between the inner link plate and the hollow bearing roller. The bearing roller of the chain comprises a first hollow roller having inward flanges on both inner circumferential sides, and a plurality of second anti-friction rollers disposed between the first roller and the bush in parallel with the center axial line of the bush, side rings mounted on the bush on an inner circumferential side and coming into close contact with the opposite side surfaces of the anti-friction rollers and the inner surfaces of the inner link plates on both sides of said bearing roller. The improved seal mechanism comprises an annular oil inner seal member, a spacer, and a disk-shaped outer seal member having on its outer circumferential portion a flange extended toward an outer side surface of the hollow roller. The seal members are sequentially disposed from the outer side surfaces of the anti-friction rollers toward the inner surface of the inner link plate. The inner annular oil seal member has an annular base portion and a pair of lip portions extended from the base portion in a forked manner, one lip portion coming into close contact with the side ring and the other lip portion coming into close contact with the spacer. The annular base portion of the inner seal is mounted in an annular cavity concentrically formed on an outer side end portion of the inner circumferential side of the inward flange of the hollow roller. The spacer has an inner hole formed at the center which fits over the side ring, and disk-shaped seal member is has a similar inner hole formed at the center and is fitted onto said side ring. At the same time, the disk-shaped seal member slidably comes into close contact with the inner link plate and the spacer respectively, and its flange loosely enters an annular concave groove concentrically formed on an outer side surface of said roller.

The present invention provides a bearing roller mounted for rotation on a bush and comprising a first hollow roller having inward flanges on both inner circumferential sides, a plurality of second anti-friction rollers disposed between the first roller and the bush in parallel with the center axial line of the bush, and side rings mounted on the bush and coming into close contact with a side surface of the anti-friction rollers and an inner surface of the inner link plates on both sides of the bearing roller. Any axial (direction of thrust) shift of the bearing roller positioned and mounted between the pair of inner link plates is prevented.

The seal mechanism comprises an annular oil seal member, a spacer, and a disk-shaped seal member having an outer flange extended toward an outer side surface of said roller. These components are sequentially disposed from the outer side surfaces of the anti-friction rollers toward the inner surfaces of the inner link plates. The seal mechanism provides a multi-seal mechanism composed of the annular oil seal member, the spacer, and the disk-shaped seal member, ensuring sufficient seal performance. As a result, even in various use environments such as in a dust atmosphere, in an atmosphere of water splashing and the like, any entry or invasion of foreign substances into the inside of the hollow bearing roller can be prevented, and at the same time preventing any leakage of lubricating oil from the inside of the hollow roller to the outside. Further, since the prevention of invasion of foreign substances is possible, the wear resistant life of the bearing roller can be improved, suppression of rotation failure of the roller can be achieved and an increase in the traveling resistance of the chain can be avoided.

The disk-shaped seal member has a flange extended toward an outer side surface of the first roller on an outer circumferential portion and this flange loosely enters an annular concave groove concentrically formed on the outer side surface of the first roller while forming space to form a labyrinth structure composed of the annular concave groove and the flange. This labyrinth structure suppresses the invasion of foreign substances to the annular oil seal member side, improving the endurance of the annular oil seal member and the spacer and preventing frictional resistance from being generated between the first roller and the disk-shaped seal member.

The annular oil seal member has an annular base portion and a pair of lip portions extended from the base portion in a forked manner. One lip portion comes into close contact with said side ring and the other lip portion comes into close contact with the spacer. The base portion is mounted in a cavity of the hollow roller concentrically formed on an outside end portion of an inward flange of the roller. The pair of lip portions and the spacer form an annular pocket. This annular pocket is used as a lubricating oil retainer, and a lubricating oil such as grease, oil or the like is sealed thereinto during an assembly of the bearing roller chain, maintaining smooth rotation of the bearing roller for a long period of time.

When the flange of the disk-shaped seal member loosely enters the annular concave groove, a labyrinth structure is formed which protects the annular oil seal member and improves the seal performance. In a case where, particularly in a bearing roller chain, a multi-seal structure is formed of the disk-shaped seal member, the spacer and the annular oil seal member, a labyrinth structure is formed by the annular concave groove on an outer side surface of the first roller and the flange. This labyrinth structure, with the spacer provided inside, and the annular oil seal member can further improve the seal performance

DESCRIPTION OF THE PREFERRED EMBODIMENT

A preferred embodiment of the present invention is illustrated in FIGS. 1 to 4. A bearing roller chain 1 has outer and inner links 4 and 8 respectively.

Figure 1:
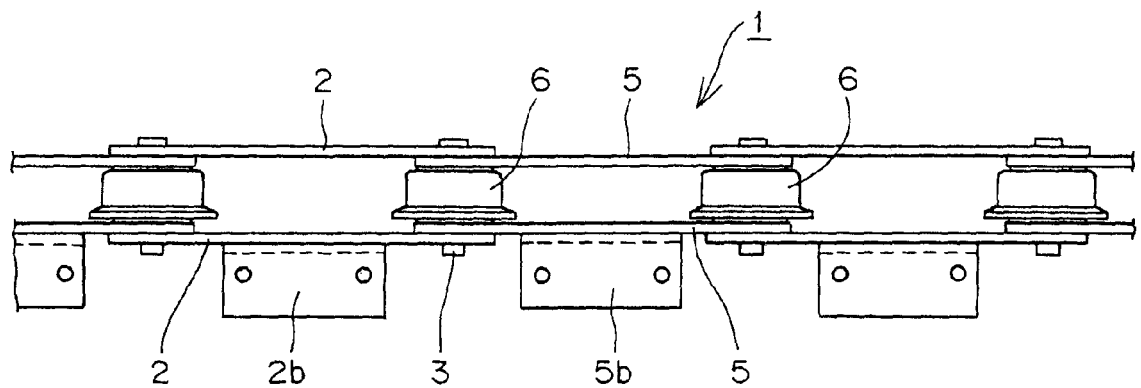
FIG. 1 is a partial plan view of a bearing roller chain according to the present invention.
Figure 2:
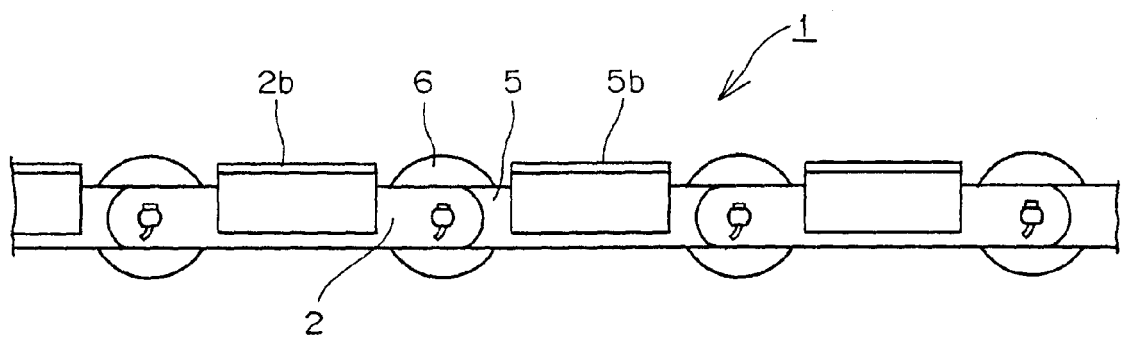
FIG. 2 is a side view of the bearing roller chain shown in FIG. 1.
Figure 3:
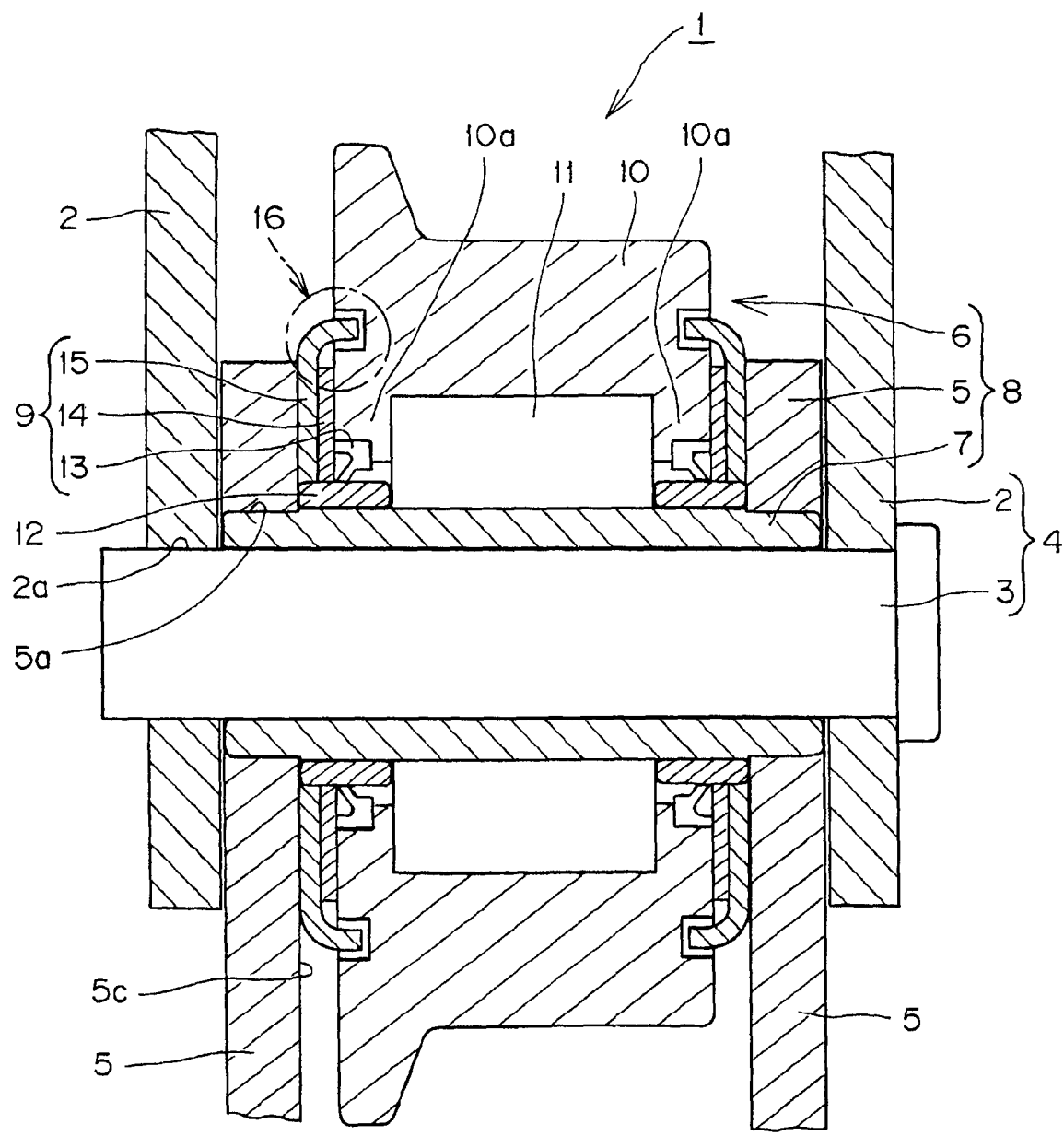
FIG. 3 is a cross-sectional view of the bearing roller of the chain shown in FIG. 1.

In the bearing roller chain 1, the outer link 4 has a pair of outer link plates 2,2 with connecting pin holes 2a, in which both end portions of a connecting pin 3 are fit-secured. The inner link 8 has a pair of inner link plates 5,5 with bush holes 5a in which both end portions of a bearing roller-mounted bush 7 are fit-secured. The outer and inner links 4 and 8 are endlessly connected to each other by loosely fitting the connecting pins 3 into the bush 7, and as shown in FIG. 3, a seal mechanism 9 is provided between the inner link plate 5 and the bearing roller assembly 6. It is noted that the reference numerals 2b and 5b in FIGS. 1 and 2 denote attachments mounted between the connecting pins 3 on the outer link plate 2 and the inner link plate 5, respectively.

In the connecting pin 3, an oil passage (not shown) may be formed inside so that a lubricating oil or grease or the like may be supplied between the connecting pin 3 and the bush 7. Alternatively, a pre-loaded oil supply may be provided during assembly of the chain between the connecting pin 3 and the bush 7. On the other hand, an oil supply structure may be omitted.

The bearing roller assembly 6 comprises, as shown in FIG. 3, a hollow roller 10 having inward flanges 10a on inner circumferential surface sides. The hollow roller functions as an outer raceway; a bush 7 functions as an inner raceway; and a plurality of anti-friction rollers 11 are disposed in parallel with a center axial line of the bush 7 between the hollow roller 10 and the bush 7. In the roller 10 of this example, the outer side surfaces 10b of both sides are flush except for a concave groove 10c.

Both sides of the bearing roller assembly 6 are respectively provided with side rings 12, 12, which fit to the bush on the inner circumferential side. The side ring 12 is in close contact with the end surfaces 11a of the anti-friction rollers 11 and the inner surface 5c of the inner link plate 5, and is fitted to the bush 7 either in a press-fit or a loosely fit manner. When this side ring 12 comes into close contact with the side surface 11a of the roller 11 and the inner surface 5c of the inner link plate 6, the anti-friction rollers 11 are held by inward flanges 10 of the roller 10 and side rings 12. Thus, an axial shift (in a thrust direction) of the bearing roller assembly 6 positioned and mounted between a pair of inner link plates can be prevented.

Figure 4:
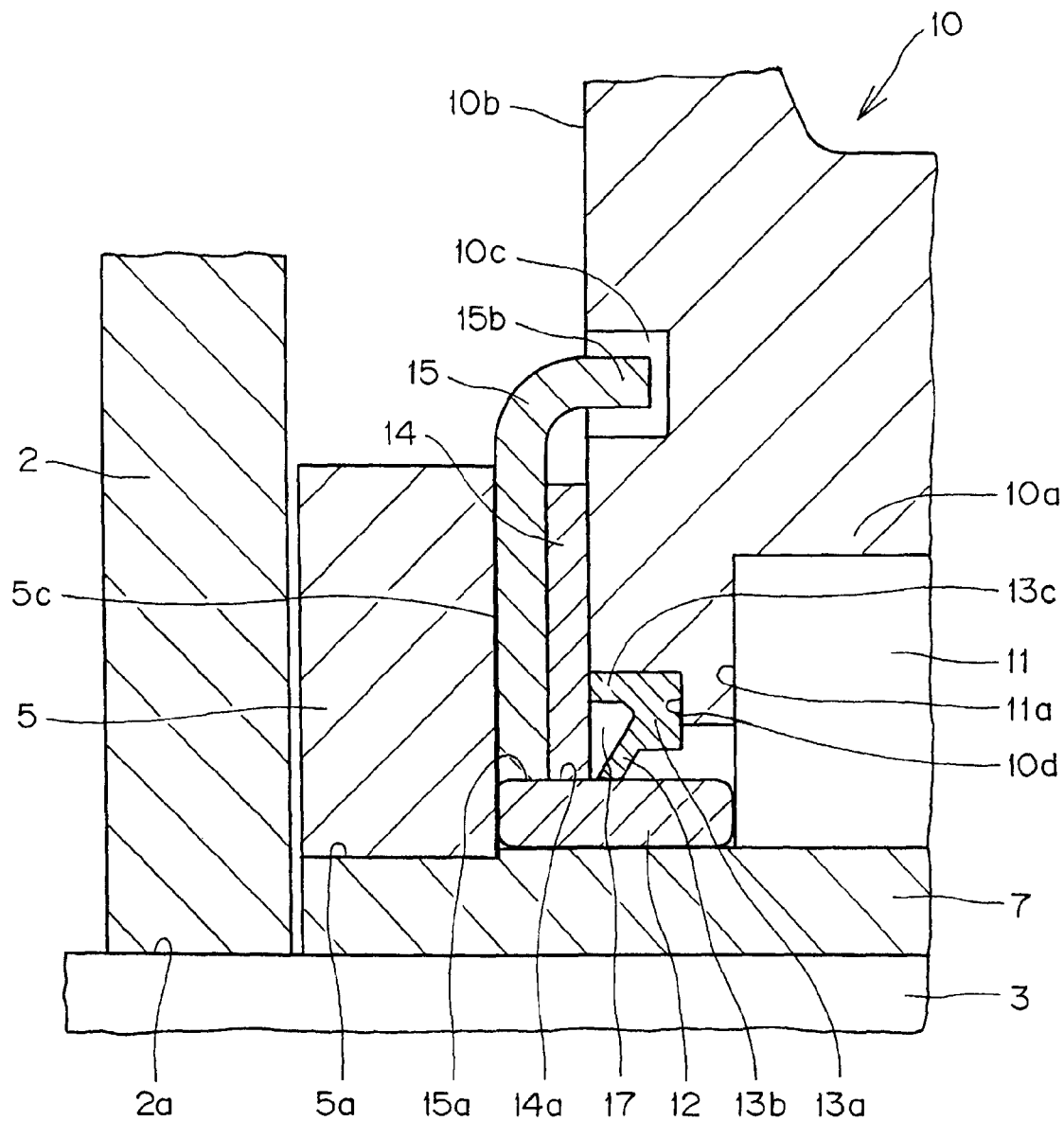
FIG. 4 is an enlarged fragmentary cross-sectional view of a the seal mechanism of the bearing roller shown in FIG. 3.
Figure 5:
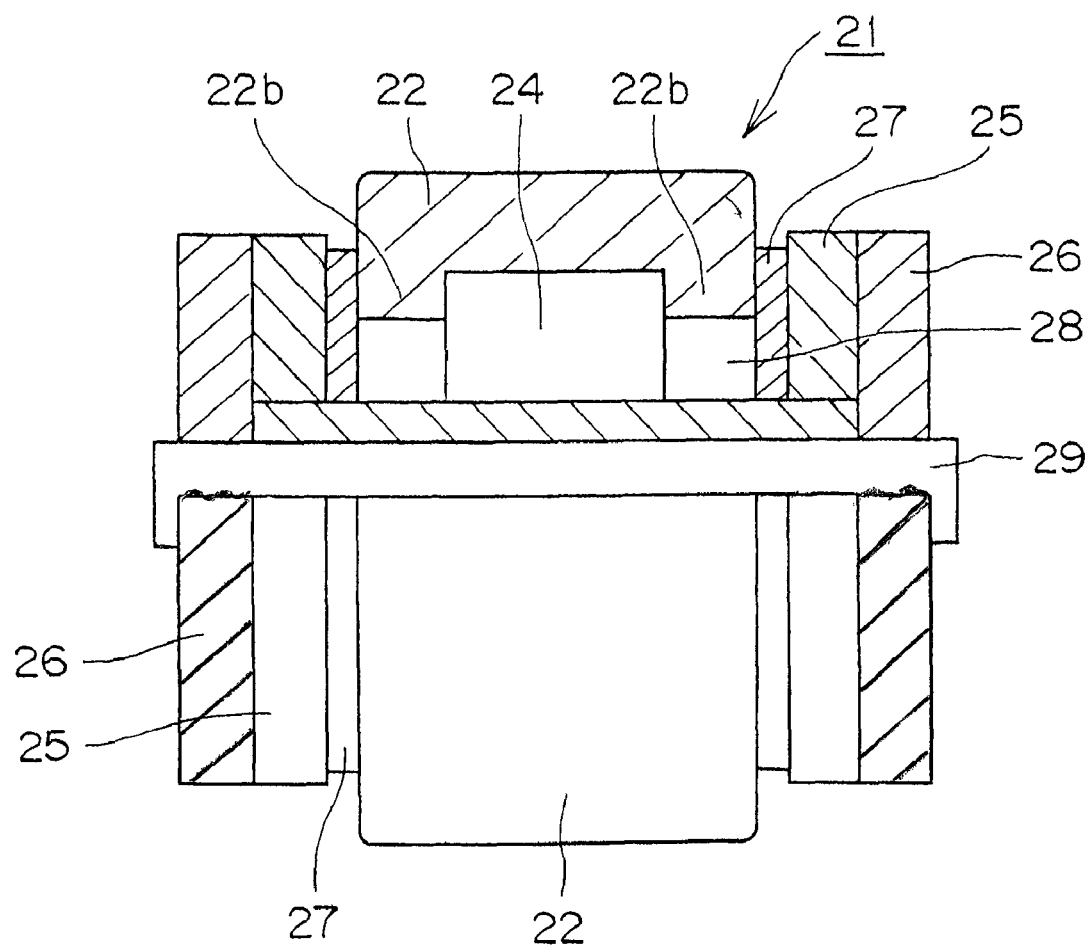
FIG. 5 is a fragmentary cross-sectional view of a conventional bearing roller chain.

As shown in FIGS. 3 and 4, the seal mechanism 9 is provided between the inner link plate 5 and the bearing roller assembly 6. This seal mechanism 9 comprises an annular oil seal member 13, a spacer 14, and a disk-shaped seal member 15, which are sequentially disposed from an outer side surface 10b of the hollow roller 10 toward an inner surface 5c of the inner link plate 5.

The annular oil seal member 13 has an annular base portion 13a and a pair of lip portions 13b and 13c extended from the base portion 13a in a forked manner, one lip portion 13b slidably comes into close contact with the side ring 12 and the other lip portion 13c slidably comes into close contact with the spacer 14. The annular oil seal member 13 is mounted in a cavity 10d concentrically formed on an outer side end portion on an inward flange 10a on the inner circumferential side of the roller 10 through the annular base portion 13a which can be either press-fitted or loosely fitted.

A spacer 14 has an inner hole 14a formed at the center and is fitted onto a side ring 12 through this inner hole 14a. A part of one surface of the spacer 14 slidably comes into close contact with an outer side surface 10b of the roller 10 and the other surface of the spacer slidably comes into close contact with a disk-shaped seal member 15.

The disk-shaped seal member 15 has an inner hole 15a formed at the center and has a flange 15b extended toward an outer side surface 10b of the roller 10 on an outer circumferential portion. The disk-shaped seal member 15 is fitted onto the side ring 12 through the inner hole 13b. One surface of the disk-shaped seal member 15 slidably comes into close contact with an inner surface 5c of the inner link plate 5 and the other surface thereof slidably comes into close contact with the spacer 14 as described above.

Further, the flange 15b loosely enters an annular concave groove 10c concentrically formed on the outer side surface 10b of the roller 10 to form a labyrinth structure. The disk-shaped seal member 15 having the flange 15b is fitted onto and mounted on the side ring 12 through the inner hole 15a so that the disk-shaped seal member 15 covers the spacer from outside and the flange 15b loosely enters an annular concave groove 10c concentrically formed on an outer side surface 10b of the roller 10 with clearance between the flange and the sides of the groove 10c.

Further, as described above, since in the annular oil seal member 13, one lip portion 13b slidably comes into close contact with the side ring 12 and the other lip portion 13c slidably comes into slide contact with the spacer 14, the pair of lip portions 13b and 13c and the spacer 14 form an annular pocket 17. This annular pocket 17 functions as a lubricating oil retainer, and when lubricating oil such as grease, oil or the like is sealed into the annular pocket 17, smooth rotation of the bearing roller can be maintained for a long period of time.

Further, as a member forming the seal mechanism 9, the annular oil seal member 13 is preferably composed of a synthetic resin or a synthetic rubber (for example a nitril rubber or a fluororubber) excellent in oil resistance, heat resistance and wear resistance, the spacer 14 is preferably composed of a synthetic resin (for example, 6 nylon) and the disk-shaped seal member 15 is preferably integrally molded and composed of steel or stainless steel.

Although a configuration of the bearing roller chain 1, in the illustrated embodiment of the present invention, has been explained above, the actions and effects of the bearing roller chain 1 will be described below. When the bearing roller chain 1 is used as a conveyor chain for example, in the bearing roller chain 1 the bearing roller 6 mounted on the bush 7 comprises a hollow roller 10 having inward flanges 10a on both inner circumferential sides and a plurality of anti-friction rollers 11 disposed in parallel with the center axial line of the bush 7 between the roller 10 and the bush 7. On both sides of the bearing roller 6 are respectively provided a side ring 12 coming into close contact with a side surface 11a of the roller 11 on one end and an inner surface 5c of the inner link plate 5 on the other end. Thus, since the anti-friction rollers 11 included in the roller 10 are held by the flanges 10a formed inward on both inner circumferential sides of the roller and by the side rings 12, an axial shift of the bearing roller 6 positioned and mounted between a pair of inner link plates 5,5 can be prevented.

Further, the seal mechanism 9 comprises an annular oil seal member 13, a spacer 14 and a disk-shaped seal member 15 having a flange 15b extended toward an outer side surface 10b of the roller on the outer circumferential portion, sequentially disposed from the outer side surface 10b of the hollow roller 10 toward an inner surface of the inner link plate. Thus, since the seal mechanism 9 has a multi-seal structure composed of the annular oil seal member 13, the spacer 14, and the disk-shaped seal member 15, sufficient seal performance can be ensured. As a result, even in various use environments such as in a dust atmosphere, in an atmosphere of water splashing and the like, the invasion or entry of foreign substances to the inside of the bearing roller 6 can be prevented and, at the same time, prevention of leakage of lubricating oil to the outside of the bearing roller 6 can be achieved. Further, since the prevention of invasion of foreign substances is possible, the wear resistance of the bearing roller 6 can be improved, avoidance of rotation failure of the roller 10 can be achieved and an increase in the traveling resistance of the chain can be avoided.

Since the disk-shaped seal member 15 has a flange 15b extended toward an outer side surface 10b of the roller 10 on its outer circumferential portion and this flange 15b loosely enters an annular concave groove 10c concentrically formed on the outer side surface 10b of the roller 10 with clearance, a labyrinth structure 16 is formed by the annular concave groove 10c and the flange 15b. This labyrinth structure 16 suppresses the entry of foreign substances toward the annular oil seal member 13. Thus, the endurance of the annular oil seal member 13 and the spacer 14 is improved. Further, since the flange 15b enters the annular concave groove 10c with clearance, no frictional resistance is generated between the hollow roller 10 and the disk-shaped seal member 15.

The annular oil seal member 13 has an annular base portion 13a and a pair of lip portions 13b and 13c extended from the base portion 13a in a forked manner. One lip portion 13b comes into close contact with the side ring 12 and the other lip portion 13c comes into close contact with the spacer 14. The member 13 is mounted in an annular cavity 10d concentrically formed on an outer side end portion on an inward flange 10a on the inner circumferential side of the roller 10 through the annular base portion 13a. The pair of lip portions 13b and 13c and the spacer 14 form an annular pocket 17.

When this annular pocket 17 is used as a lubricating oil retainer (grease retainer) and a lubricating oil such as grease, oil or the like is sealed thereinto during an assembly of the bearing roller chain 1, smooth rotation of the bearing roller 6 can be maintained for a long period of time so that the long life of the chain can be exhibited.

An inner seal structure is formed by the disk-shaped seal member 15, the spacer 14 and the annular oil seal member 13, and an outer labyrinth seal structure 16 is formed by the annular concave groove 10c on an outer side surface 10b of the roller 10 and the flange 15b. This outer seal structure 16 and the inner seal structure can further improve the seal performance, and the invasion of foreign substances from the outer portion into the inside of the bearing roller 6, and leakage of stored lubricating oil out from the inside can be prevented.

The invention claimed is:

1. A bearing roller chain with a pair of inner link plates having bush holes, a bush having both ends fit-secured into said bush holes, a bearing roller rotatable on said bush, and a seal mechanism between each end of said bearing roller and the adjacent inner link plate, wherein said bearing roller comprises a hollow first roller with an inner circumferential surface with inward flanges at both ends, and end surfaces with annular concave grooves concentric with said bearing, and a plurality of second anti-friction rollers disposed between said first roller and said bush in parallel with said bush, said bearing roller further comprising side rings at both ends of said bearing roller, each side ring having one side adjacent an end surface of said second anti-friction roller and another side confronting the inner surface of the associated link plate, said seal mechanism comprises an annular seal member, a spacer, and a disk-shaped seal member having a flange extended toward the confronting end surface of said hollow roller, said annular seal member and said spacer and said disk-shaped seal member being sequentially disposed between the ends of said anti-friction rollers and said inner link plate, said annular seal member having an annular base portion and plurality of lip portions extending from said base portion in a forked manner, one of said lip portions coming into close contact with said side ring, another of said lip portions coming into close contact with said spacer, each of said inward flanges having a cavity confronting said seal mechanism, said annular base portion being mounted in said cavity, said flange of the disk-shaped seal member entering said annular concave groove concentrically, thereby forming a labyrinth structure enhancing the performance of said seal mechanism.

2. A bearing roller chain according to claim 1, wherein each of said spacer and said disc shaped seal member has an inner hole conforming to the outer perimeter of said side ring, and being mounted on said side ring, said first lip portion being in close contact with said side ring adjacent said spacer.

3. A bearing roller chain according to claim 2, wherein said disc shaped seal member is in close contact with said inner link plate on one side and said spacer on the other side.

4. A bearing roller according to claim 1 wherein said inward flanges define between them an outer raceway for said second anti-friction rollers, and said side rings define between them an inner raceway for said second anti-friction rollers.

5. A bearing roller chain with a pair of inner link plates having bush holes, a bush having both ends fit-secured into said bush holes, a bearing roller rotatable on said bush, and a seal mechanism between each end of said bearing roller and the adjacent inner link plate, wherein said bearing roller comprises a hollow first roller with an inner circumferential surface with inward flanges at both ends, and end surfaces with annular concave grooves concentric with said bearing, a plurality of second anti-friction rollers disposed between said first roller and said bush in parallel with said bush, said seal mechanism comprises an annular seal member, a spacer, and a disk-shaped seal member having a flange extended toward the confronting end of said hollow bearing roller, said annular seal member and said spacer and said disk-shaped seal being sequentially disposed between the ends of said anti-friction rollers and said inner link plate, said annular seal member having an annular base portion and plurality of lip portions extending from said base portion in a forked manner, one of said lip portions coming into close contact with said spacer, each of said inward flanges having a cavity confronting said seal mechanism, said annular base portion being mounted in close contact with said cavity, said flange of the disk-shaped seal member entering the annular concave groove in said confronting end of aid hollow roller, thereby forming a labyrinth structure enhancing the performance of said seal mechanism.

6. A bearing roller chain according to claim 5, including side rings at both sides of said hollow roller, wherein each of said spacer and said disc shaped seal member has an inner hole conforming to the outer perimeter of said side ring, and being mounted on said side ring, another of said lip portions being in close contact with said side ring adjacent said spacer.

7. A bearing roller according to claim 6 wherein said inward flanges define between them an outer raceway for said second anti-friction rollers, and said side rings define between them an inner raceway for said second anti-friction rollers.

8. A bearing roller chain according to claim 5, wherein said disk shaped seal member is in close contact with said inner link plate on one side and said spacer on the other side.

* * * * *